United States Patent Office 2,993,869
Patented July 25, 1961

2,993,869
CELLULAR POLYURETHANE ELASTOMER AND PREPARATION OF SAME USING A MORPHOLINE CATALYST
George T. Gmitter and Edwin M. Maxey, Akron, Ohio, assignors to The General Tire & Rubber Company, Akron, Ohio, a corporation of Ohio
No Drawing. Filed Dec. 5, 1956, Ser. No. 626,314
14 Claims. (Cl. 260—2.5)

This invention relates to polyester and/or polyether diisocyanate foams and more particularly to the use of catalysts in the production of foams having excellent resiliency.

In the ordinary method of making cellular polyurethane or foamed polyester diisocyanate reaction products, a viscous, non-linear liquid polyester is pumped at a controlled rate through a nozzle. An organic polyisocyanate, preferably a diisocyanate having two and only two isocyanate groups, is pumped, but at extremely high pressure, to the nozzle, where it contacts the stream of polyester and is thoroughly mixed therewith because of its high velocity. A small amount of water is also introduced into the nozzle either as a stream or in admixture with the polyester. A suitable cross-linking agent, such as 1,3-propylene glycol, and a reaction catalyst, such as certain tertiary alkyl amines, are also generally mixed with the polyester or introduced into the nozzle along with an emulsifying agent which is used to obtain good dispersion of the catalysts. A stirrer is also generally present in the nozzle to insure homogeneous mixing. From the nozzle, the material is incorporated into a suitable mold, such as an open pan, which is moved in a continuous manner relative to the nozzle to provide the desired layer of viscous reactants on the bottom of the pan or mold.

Polymerization starts as the materials are mixed and the semi-fluid mass is discharged from the nozzle. The mixing of the material is very important. It is essential that the diisocyanate and catalyst be almost immediately and completely dispersed in the polyester. The rate of polymerization is relatively fast and the mass is shaped by the contour of the pans. Carbon dioxide is evolved in the gaseous state from the time of mixing so that the bubbling and frothing occurs during the mixing, discharging and shaping stages. The resultant foamed product is thereafter heated to cure the product.

Another method of producing polyurethane foam products is to dissolve or disperse an easily liquefied gas such as a FREON in the polyester and using the FREON gas as a means of blowing the polyurethane. This method of producing excellent light-density foams is described in the U.S. application, Serial No. 541,823, filed October 20, 1955, now abandoned, of Charles B. Frost, assigned to the assignee of the present application.

In the past great difficulties have been encountered in the production of cellular polyurethane materials since the resultant polyurethane lacked some of the desirable properties of sponge rubber, such as resiliency and resistance to humidity aging. Generally, the wringing and flexing of polyurethane foams has caused great decrease in their resiliency, which is a serious limitation to their use. In the case of polyester-diisocyanate foams, it has been thought impossible to produce a foam with both good resiliency and resistance to humidity aging.

It is important that a reaction catalyst be provided to accelerate the polyester-diisocyanate reaction so that linear growth of the polymer will be fast enough to change the polymer from the liquid state to the gelled state in order to entrap any gas evolved. Ordinary tertiary amines such as tripropylamine have been used as the catalyst and were found to be effective and very quick acting. The products produced, however, have been lacking in resilience, particularly after wringing of the material to provide open cell structure required for "breathing," which is so desirable in cushion material. The products also have deteriorated badly when aged under conditions of high humidity, particularly at elevated temperatures.

It is an object of the present invention to provide a polyurethane foam with properties of good resiliency and resistance to humidity aging, which is formed by a process in which the isocyanate-ester reaction takes place in a reasonable time.

It is a further object to provide a process for producing a polyurethane foam that has good resiliency even after wringing to break closed cells, and flexing.

It is still another object to provide a process for making foam with better resiliency and better resistance to steam aging than those heretofore produced.

We have found that certain amine type catalysts, which are characterized by a cyclic structure having an oxygen or sulfur atom at a position beta to an amino nitrogen atom such as a morpholine and derivatives thereof when substituted for all or part of the usual tertiary alkyl amine catalysts, greatly influence and enhance the resiliency of the foamed product. Unexpectedly, the resiliency after rupture of the cell walls is equal to or in many cases increased over the resiliency before such rupture.

We have also found that the reaction catalysts apparently act not only to accelerate the formation of the linear polyurethane chain but also to accelerate its decomposition. According to the present invention, therefore the cured foamed material is largely removed as by wringing or cracking the sponge at elevated temperatures where the catalyst is more volatile to make the product breathable as well as to uncover and eliminate any catalyst which might remain as vapor in the foamed material and accelerate decomposition of the material. The foamed material is also preferably heated between each cycle of wringing or compressing between rolls in order to more readily volatilize and eliminate remaining catalysts so that the catalysts are no longer present to catalyze the reverse reaction. The wringing thus imparts good humidity aging resistance to the foamed material.

The porous material is prepared by mixing an excess of an organic diisocyanate with a suitable polyester and/or polyether in the presence of a small amount of water to react with isocyanate and produce carbon dioxide gas, and curing the foam thus produced. The reaction is accelerated in accordance with this invention by a catalyst which comprises at least in part a tertiary amino alcohol catalyst having a free hydroxyl group or oxygen atom attached to a carbon atom in a position beta to the amino nitrogen atom. The cellular foamed reaction product is cured by heat to render it rubbery and tack-free and then preferably wrung or cracked by passing it between closely spaced rolls such as calender rolls which travel at equal surface speeds, so as to make the cured foamed product breathable.

The active hydrogen compound used to react with the organic diisocyanate is preferably selected from a member of the group consisting of dihydroxy polyesters and dihydroxy polyethers. Suitable polyesters and polyethers are those described in the previously mentioned application of Charles B. Frost or U.S. Patent No. 2,577,279 to Simon et al.

The rigidity of the foam is largely controlled by the amount of cross linking or trifunctional reactants present in the polyester and isocyanate. In general, cross-linking type polyesters or polyethers with substantial amounts of trifunctional materials that promote branching are used for rigid foamed urethanes while more linear polyesters or polyethers with molecular weights preferably from about 1500 to 2500 are generally used for producing the flexible polyurethane rubbers. Generally, polyethers are preferred for superior humidity aging resistance and low temperature flexibility, although excellent humidity resistance may be obtained with polyesters when the new catalysts are used as herein set forth. In accordance with the present invention, the molecular weight may be as low as 500 to 600 to obtain some benefits of this invention although the product tends to be more rigid than one produced with a higher molecular weight, and molecular weights as high as 3000 or 4000, or even higher may be used, although the expense of producing polyesters with molecular weights much over 5000 are generally prohibitive. The polyester preferably has a hydroxyl number of about 40 to 80 and no acid number, or an acid number that is low such as less than 10.

All or part of the polyesters used in the examples may be substituted by polyethers. Suitable polyethers for use in obtaining improved polyurethane foams are polyalkylene ether glycols such as the mixed polyglycol or ethylene-propylene, polytetramethylene glycol, polypropylene glycol and polyethylene glycol, etc., the latter of which is sold under the name of "Carbowax 1000" and has a molecular weight of about 1000. Polyethers are preferred which have a molecular weight above 700 but those with a molecular weight as low as 500 to 600 or as high as 5000 or even somewhat higher may be used, depending upon the type of improved foamed product desired. Other suitable polyethers besides the aforementioned mixed polyalkylene ether glycols such as poly (ethylene-propylene) ether glycols are polytrimethylene ether glycol, polyneopentylene ether glycol, and polypentamethylene ether glycol and mixtures of these. Best results are obtained with a polypropylene or higher glycol having a molecular weight of 2000 to 3000.

The main portion of the polyisocyanate compounds for non-rigid foams are those having two, and only two, active isocyanate groups.

Examples of some of the suitable diisocyanates are:

Tolylene diisocyanate;
p,p'-Diisocyanato diphenyl methane;
Naphthalene 1,5-diisocyanate;
Metaphenylene diisocyanate;
Bitolylene diisocyanate;
Hexamethylene diisocyanate; and
Durene diisocyanate Some triisocyanates may be used in conjunction with one or more of the above when more rigidity is desired or when the polyether or polyester has insufficient trifunctionality to give the desired degree of branching.

A small amount of water is added to provide $CO_2$ gas from its reaction with isocyanate groups in excess over those required for the reaction with the polyester or polyether. The formation of the $CO_2$ provides the expansion necessary to form a foam. Preferably the blowing action for the foam is provided by dispersing or dissolving an easily liquefied alkane gas such as dichlorofluoromethane in the polyester which changes from the liquid to gaseous state upon reaching room temperature or below as described in the previously mentioned application of Charles B. Frost.

The catalyst is found, as before stated, to make a profound difference in humidity aging, flexibility and resilience after cells have been ruptured by wringing. The catalysts which provide this new result are compounds with a cyclic structure such as a morpholine ring structure having an chalcogen atom having an atomic number less than 33 such as oxygen and sulfur attached to a carbon atom located at a position beta to the amino nitrogen atom. The sulfur or oxygen attached to a carbon atom beta to the amino nitrogen atom is part of the cyclic structure and not free to react with other compounds. It is important that an oxygen atom be attached to a beta carbon in order to obtain excellent resiliency after wringing. The compound also is preferably volatile at temperatures less than 300° F. so that the compound is easily largely removed or driven off by wringing or compressing the material a plurality of times to displace gas from the cells while the material is hot or while the catalyst is in the form of vapor.

The preferred catalysts of the present invention are N-octyl morpholine and N-coco morpholine. The "coco" group relates to groups obtained from the fractionation of coco-nut oil, which is primarily the lauryl group. Suitable catalysts for a cyclic structure with an oxygen or sulfur atom connected to a beta carbon atom are N-acetyl morpholine, 4,4'-dithio morpholine, N-methyl morpholine, N-ethyl morpholine, N-phenyl morpholine, and N-hydroxy ethyl morpholine. The morpholine compounds are preferably liquid but they may be solid, as in the case of N-phenyl morpholine, which is preferably ground to a finely divided state in order to provide better dispersion. The morpholine compounds are also preferably water-soluble but they may also be conveniently added in a finely divided state and dispersed in a water-emulsifier system. This water-emulsifier system may be conveniently prepared prior to use.

As previously stated the morpholine-type catalysts are slower acting than alkyl amines, such as tripropylene amine, so that mixtures of morpholine-type catalysts and ordinary tertiary amines may be preferred in order to promote chain growth quickly enough to effectively trap the blowing gas and thus to provide a light density foam.

Apparently N-methyl morpholine is a quick acting catalyst and mixtures of N-methyl morpholine with slower acting catalysts such as N-octyl morpholine and N-coco morpholine are preferred in some cases in order to obtain a very light density foam and still obtain superior resilient properties. A fast acting catalyst such as N-methyl morpholine is preferably used in percentages of about 10 to 50 percent of the total morpholine-type catalyst in order to obtain the lightest density foamed elastomers.

The catalysts of the present invention increase resiliency of the resultant foam material, even when used in amounts as low as .05 part by weight based on the weight of the polyester and diisocyanate. The preferred range for maximum benefits is about 1 to 3 parts by weight of the morpholine catalyst, while amounts of over 5 parts of the catalyst tend to decrease the resilient properties of the product as well as its resistance to humidity aging.

Emulsifiers preferably are used with morpholine catalysts so as to obtain good dispersion to better catalyze the reaction and the emulsifiers may be anionic or cationic in nature. The purpose of the emulsifier is to control the foaming velocity during the formation state.

As previously described, the foamed polyurethane is produced by thorough mixing of the polyester or polyether and the diisocyanate. A suitable compound for producing the blowing action, such as water or difluoromonochloromethane, is also mixed in along with a cross-linking catalyst and the morpholine type catalyst of the present invention. The foamed reaction product is thermoplastic in nature and should be changed to thermosetting in nature by heating the product to cure it and give it the desired rubbery elastic properties. A temperature of around 200° F. to 250° F. or 275° F. is usually used for curing the foam and curing time is usually 3 to 8 hours at the elevated temperature.

After curing, beyond the tacky state the sponge product is preferably subjected to a wringing or cracking operation such as passing it between tight rolls of a calender mill in order to break bubbly and closed cell structure to make the foam more breathable. A large number of closed cells are produced and wringing is preferred to make a breathable product. We have found that wringing of the foam while at elevated temperature, say of about 150° F. to 300° F. is exceptionally important in eliminating traces of catalysts when one uses catalyst mixtures in which part of the catalysts are free, i.e., do not have an oxygen atom or other group such as hydroxyl to react with the isocyanate or other reactants. When the catalysts do have groups that react with the reactants, the catalyst apparently cannot catalyze the reverse polyurethane reaction that destroys the foamed product. Several wringings at elevated temperatures, such as curing temperature are preferred to remove the free catalyst from the pores while in a volatile state. The free catalyst as above stated is found to cause reversion under conditions of high humidity or steam.

Generally a more uniform product is prepared by controlling the temperature of the reactants to a temperature of preferably close to 72° F. Best results are obtained by preventing contamination of the diisocyanate of polyester with moisture or the mixing thereof. While the temperatures of the receiving pans are not critical, they should be in the range of 72° F. to 95° F. in temperature. The cure should be full and complete to insure full benefits of the preesnt invention and the cure time is generally from 3 to 6 hours, although it depends upon the exact formulation and conditions of curing. An inadequate cure may provide poor aging and setting properties and any additional heat does not seem to overcure the foam and cause a resultant loss of desirable properties.

The foamed materials of the present invention are preferably formed by first reacting a polyester and/or polyether with a substantial excess of a diisocyanate over a 1:1 molar ratio in the absence of any water so as to form a flowable or viscous dry partially reacted "pre-polymer" so that there are free isocyanate groups present. Subsequently, the dry "pre-polymer" is reacted with water, a cross linking agent containing a plurality of labile hydrogens, and a tertiary amine catalyst of the present invention. There is a minimum of agitation after the initial dispersion of water in the "pre-polymer" to prevent the loss of $CO_2$. The amount of water used is generally about 1 to 3 parts by weight based on 100 parts of prepolymer to provide $CO_2$ for a low density product, although as low as 0.5 part by weight can be used to obtain benefits of this invention. When more than 5 parts are used, the urea linkages formed apparently cause a decrease in the resiliency of the foamed product.

The foams of the present invention may be produced with the use of plasticizers, fillers or antioxidants such as organic phosphites, or other additives.

EXAMPLE 1

Dichlorodifluoromethane, sold by Du Pont under the name "Freon-12" having a vapor pressure of 84.8 p.s.i. at 70° F., was dispersed as a liquid in the polyester sold as Desmophen-2200. This polyester is the reaction product of about 1 mol adipic acid, 1 mol diethylene glycol, and about 1/30 mol of trimethylol propane, which latter provides for branching and cross-linking during the subsequent reaction with diisocyanate. The viscosity of the polyester is held between 1000 and 1100 c.p.s. at 73° C.; its moisture content is below 2% and preferably is varied between 0.3 and 0.5%, and it has predominantly hydroxyl end groups.

The polyester is mixed with the liquefied gas in an autoclave equipped for agitation for good dispersion and the mixture containing the dispersed liquefied gas is pumped to the aforementioned nozzle of the foam machine after first warming the polyester to about 72° F. A 70:30 mixture of 2,4- and 2,6-tolylene diisocyanate is also pumped at about 1000 pounds pressure through small orifices to the nozzles to react with the polyester to form the polyurethane. The rate of flow through the nozzle is in accordance with the following recipe:

*Table I*

Material: | Parts by weight of liquid (grams)
--- | ---
Polyester | 100 (about 84 ml.)
Tolylene diisocyanate | 25 (about 21 ml.)
Activator | 4.9
Dichlorodifluoromethane | 5

The activator in one case is composed of:

| | Parts |
|---|---|
| (a) A catalyst for the polyurethane reaction consisting of N-octyl morpholine | 1 |
| (b) An emulsifier used for combining the catalyst with water, consisting of a soap of 0.1 part of sodium dioctyl sulfosuccinate and 1.5 parts of polyethylene glycol tertiary dioctylthioether | 1.6 |
| (c) Water | 1.6 |

Another activator composition with N-coco Morpholine as the reaction catalyst may be made up as follows:

Ingredient: | Parts by weight
--- | ---
N-coco Morpholine | 1.0
Water | 1.6
Sodium dioctyl sulfosuccinate | 0.3
Nonyl phenoxy polyoxyethylene ethanol | 1.0

The results of the test conducted on the resultant foamed products made with the two different catalysts may be found in Table II, below:

*Table II*

| Reaction Catalyst | Percent Rebound | | |
|---|---|---|---|
| | Original | Rebound after 5 passes through wringer | Rebound after 20 passes through wringer |
| N-octyl Morpholine | 42 | 42 | 42 |
| N-coco Morpholine | 34 | 43 | 46 |

It is noted that the products retain great resiliency even though subjected to wringing. In some tests, the values of resiliency show an increase.

EXAMPLE 2

Polyurethane foams were prepared by mixing the following formulas with an air stirrer in half-gallon containers:

118 grams (about 98 ml.) polyester
30 grams (about 25 ml.) tolylenediisocyanate
Amine and activator as indicated.

The foams were formed by the liberation of $CO_2$ from the reaction of water and isocyanate groups of the diisocyanate compound. Results of tests conducted on the foamed products are found in Table III.

It is to be understood that in accordance with the provisions of the patent statutes, the particular form of prod- Table III

| Morpholine Catalyst | grams/cc. (Density) | Amount (grams) | Activator | Foam Time (mins.) | Comp. Set (B) | Percent Rebound | | | | 25% Comp. Defl., 10 sq. in. | |
|---|---|---|---|---|---|---|---|---|---|---|---|
| | | | | | | 0W | 5W | 20W | 35W | 0W | 35W |
| N-octyl morpholine | { 0.087 | 1.0 | L | 6 | 4.8 | 42 | 42 | 40 | 40 | 35½ | 21 |
| | 0.072 | 1.5 | L | 5 | 3.8 | 42 | 34 | 35 | 38 | 45 | 27½ |
| Do | | 1.0 | S | 11 | 9.2 | 45 | 39 | 44 | 45 | 46 | 25 |
| | | 1.5 | S | 7 | 9.1 | 36 | 40 | 42 | 42 | 33 | 20½ |
| | | 1.0 | P | 21 | | 47 | 44 | 46 | 45 | 38 | 23 |
| N-coco morpholine | | 1.5 | P | 13 | | 48 | 44 | 44 | 44 | 38 | 20 |
| N-hydroxyl ethyl morpholine | | 1.0 | G | 16 | 7.1 | 38 | 42 | 40 | 40 | 41 | 21 |
| | | 1.5 | G | 14 | 6.5 | 36 | 41 | 38 | 38 | 45 | 21½ |

| Activator G | | Activator L | | Activator P | | Activator S | |
|---|---|---|---|---|---|---|---|
| | Grams | | Grams | | Grams | | Grams |
| Water | 1.6 | Water | 1.6 | Water | 1.6 | Water | 1.6 |
| Aerosol OT | 0.1 | Emulgator O | 1.5 | Igepon CN-42 | 1.5 | Igepal CO-630 | 1.0 |
| Igepal CO-630 | 1.5 | Aerosol OT | 0.1 | Aerosol OT | 0.1 | Igepon ON-42 | 0.1 |
| Total | 3.2 | Total | 3.2 | Total | 3.2 | Total | 2.7 |

In the above Table, 0W means no wringing, while 5W means 5 wrings or 5 passes through the wringing rolls. In a like manner, 35W means 35 cycles of wringing.

In the above table, Igepal CO-630 is nonyl phenoxy polyoxyethylene ethanol sold by General Aniline and Film Co. Igepon CN-42 is an anionic emulsifier sold by the Antara Division of General Aniline and Film Co., which is chemically sodium-N-cyclohexyl-N-palmitoyl taurate. Emulgator 0 is an emulsifier used to combine amine catalysts with water. It is a soap of oleic acid and diethyl amine, and is oil-soluble and not miscible with water.

EXAMPLE 3

Polyurethane foams were prepared as in Example 2 and were tested using the same amounts of polyester and diisocyanate but having the catalyst and solutions somewhat changed as shown. Otherwise the conditions were as in Example 2. The products were tested, the results of which are shown in Table IV.

uct shown and described and the particular procedure set forth are presented for purposes of explanation and illustration and that various modifications of said product and procedure can be made without departing from our invention.

Having thus described our invention, we claim:

1. In the method of making a polyurethane foam material in which (1) about one mole equivalent weight of a hydroxyl terminated polyol having a molecular weight of at least 500 in which the polyol is selected from the group consisting of polyalkylene ether glycols and polyesters, said polyester being the reaction product of a polycarboxylic acid and a polyhydric alcohol, is mixed with (2) more than a mole equivalent weight of an organic diisocyanate, and (3) from about 0.5 to 5 parts by weight of water based on 100 parts by weight of said polyol and said diisocyanate to form a cellular solid polyurethane, the improvement which comprises reacting the diisocyanate, polyol, and water in the presence of from about Table IV

| Morpholine Catalyst | Grams of Tripropyl Amine Catalyst | Amt. (grams) of Morpholine Catalyst | Activator | Foam Time (mins.) | Comp. Set (B) | Percent Rebound | | 25% Comp. Defl., 10 sq. in. | |
|---|---|---|---|---|---|---|---|---|---|
| | | | | | | 0W | 35W | 0W | 35W |
| N-acetyl morpholine | { 0.3 | 1.0 | D | 4 | 10.5 | 34 | 37 | fissure. | |
| | 0.3 | 0.5 | D | 5 | 12.6 | 31 | 33 | Do. | |
| 4,4'-dithiodimorpholine | { 0.3 | 1.0 | D | 4½ | 13.2 | 35 | 39 | Do. | |
| | 0.3 | 0.5 | D | 5½ | 12.1 | 33 | 33 | 28 | 27 |
| N-ethyl morpholine | { 0.3 | 1.0 | D | 1½ | 9.7 | 27 | 29 | 21 | 15 |
| | 0.3 | 0.5 | D | 1½ | 12.8 | 26 | 31 | 20 | 13 |

| Activator D | |
|---|---|
| | Grams |
| Nonic-260 | 1.0 |
| Water | 1.6 |
| Aerosol OT—100% (sodium dioctyl sulfosuccinate) | 0.1 |
| Total | 2.7 |

In the above table, Nonic 260 is a polyethylene glycol tertiary doceyl-thioether sold by Sharples Chemical.

0.05 to 5 parts by weight based on the weight of said diisocyanate and polyol of a catalyst composition comprising a tertiary amine of the general formula

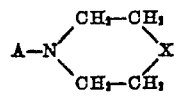

where X is selected from the group consisting of oxygen and sulfur, where A is selected from the group consisting of

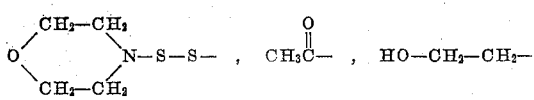

phenyl and R radicals and where R is an acyclic aliphatic hydrocarbon radical of from 1 to 18 carbon atoms, and thereafter heating and wringing the resultant cellular polyurethane while it is at a temperature of from about 150° F. to 300° F. to break closed cells and to remove free catalyst.

2. The method as defined in claim 1 in which X is oxygen.

3. The method as defined in claim 1 in which X is sulfur.

4. In the method of making a polyurethane foamed material in which about one mole equivalent weight of a hydroxyl terminated polyol having a molecular weight of at least 500 in which the polyol is selected from the group consisting of polyalkylene ether glycols and polyesters, said polyester being the reaction product of a polycarboxylic acid and a polyhydric alcohol, is mixed with a substantial excess over a 1:1 mole equivalent weight ratio of an organic polyisocyanate having from 2 to 3 functional isocyanato groups and from about 0.5 to 5 parts by weight of water based on 100 parts by weight of said polyol and said polyisocyanate, the steps comprising reacting the water, polyisocyanate and polyol in the presence of a catalyst composition of from about 0.05 to 5 parts by weight based on the weight of said polyisocyanate and polyol of a tertiary amine of the general formula:

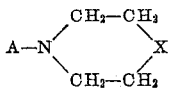

where X is selected from the group consisting of oxygen and sulfur, and where A is selected from the group consisting of

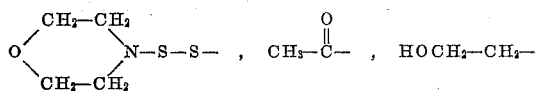

phenyl and R radicals where R is an acyclic aliphatic hydrocarbon radical of from 1 to 18 carbon atoms, and wringing and heating the foamed material thus produced to open closed cells and to remove free catalyst while it is in vapor form.

5. A method of making a polyurethane foamed material comprising the steps of mixing about 1 mole equivalent weight of a dihydroxy terminated polyalkylene ether glycol having a molecular weight of from about 500 to 5000 and a substantial excess over a 1:1 mole equivalent weight ratio of an organic diisocyanate, reacting the diisocyanate and polyalkylene ether glycol with from about 0.5 to 5 parts by weight of water per 100 parts by weight of said diisocyanate and glycol in the presence of from 0.05 to 5 parts by weight based on the weight of said glycol and diisocyanate of a tertiary amine catalyst of the general formula:

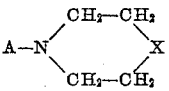

where X is selected from the group consisting of oxygen and sulfur, and where A is selected from the group consisting of

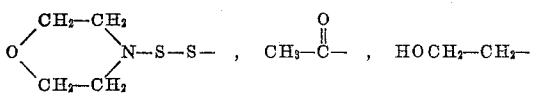

phenyl and R radicals where R is an acyclic aliphatic hydrocarbon radical of from 1 to 18 carbon atoms, and heating and wringing the foamed material thus produced at a temperature of from about 150° F. to 300° F. to break the closed cells and to remove free catalyst.

6. A method of making a polyurethane foamed material comprising the steps of mixing about 1 mole equivalent weight of a dihydroxy terminated polyester of a polycarboxylic acid and a polyhydric alcohol having a molecular weight of from about 500 to 5000 and a substantial excess over a 1:1 mol equivalent weight ratio of an organic diisocyanate, reacting the diisocyanate and polyester with from about 0.5 to 5 parts by weight of water per 100 parts by weight of said diisocyanate and polyester in the presence of from 0.05 to 5 parts by weight based on the weight of said polyester and diisocyanate of a tertiary amine catalyst of the general formula:

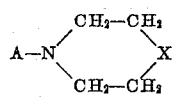

where X is selected from the group consisting of oxygen and sulfur, and where A is selected from the group consisting of

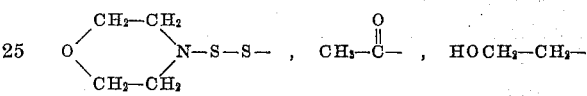

phenyl and R radicals where R is an acyclic aliphatic hydrocarbon radical of from 1 to 18 carbon atoms, to produce a polyester-urethane foam and repeatedly wringing said polyester urethane foam at a temperature of from about 150 to 300° F. to break the closed cells and to vaporize free catalyst.

7. The method as defined in claim 1 in which the tertiary amine is N-octyl morpholine.

8. The method as defined in claim 1 in which the tertiary amine is N-coco morpholine.

9. A cellular polyurethane elastomer having been wrung while heated to remove free catalyst and to open closed cells and comprising the reaction product of about (1) one mole equivalent weight of a hydroxy terminated polyol having a molecular weight of at least 500 in which the polyol is selected from the group consisting of polyalkylene ether glycols and polyesters, said polyester being the reaction product of a polycarboxylic acid and a polyhydric alcohol, and (2) a substantial excess over a 1:1 mole equivalent weight ratio of an organic polyisocyanate having from 2 to 3 functional isocyanato groups and (3) from about 0.5 to 5 parts by weight of water based on the weight of said polyol and said polyisocyanate in the presence of a catalyst composition comprising from about 0.05 to 5 parts by weight based on the weight of said polyol and said polyisocyanate of a tertiary amine of the general formula:

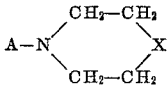

where X is selected from the group consisting of oxygen and sulfur, and where A is selected from the group consisting of

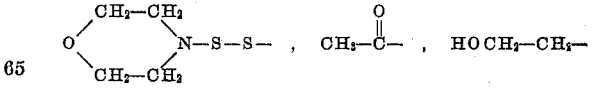

phenyl and R radicals where R is an acyclic aliphatic hydrocarbon radical of from 1 to 18 carbon atoms.

10. The method as defined in claim 1 in which the tertiary amine is N-methyl morpholine.

11. The method as defined in claim 1 in which the tertiary amine is N-ethyl morpholine.

12. The method as defined in claim 1 in which the tertiary amine is a N-alkyl morpholine wherein said alkyl radical has from 1 to 18 carbon atoms.

13. In the method of making a polyurethane foamed material in which about one mole equivalent weight of a hydroxyl terminated polyol having a molecular weight of at least 500 in which the polyol is selected from the group consisting of polyalkylene ether glycols and polyesters, said polyester being the reaction product of a polycarboxylic acid and a polyhydric alcohol, is mixed and reacted with a substantial excess over a 1:1 mol equivalent weight ratio of an organic polyisocyanate having from 2 to 3 functional isocyanato groups to form a viscous anhydrous prepolymer which is subsequently reacted to form a cellular polyurethane material, the improvement which comprises reacting the prepolymer with from about 0.5 to 5 parts by weight of water based on 100 parts by weight of said prepolymer in the presence of a catalyst composition of from about 0.05 to 5 parts by weight based on the weight of said polyisocyanate and polyol of a tertiary amine of the general formula:

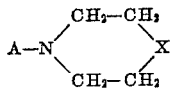

where X is selected from the group consisting of oxygen and sulfur and where A is selected from the group consisting of

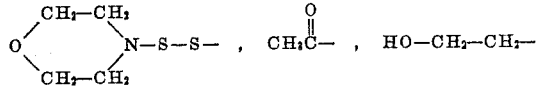

phenyl and R radicals where R is an acyclic aliphatic hydrocarbon radical of from 1 to 18 carbon atoms, and thereafter heating and wringing the resultant cellular polyurethane to open closed cells and to remove catalyst while it is in vapor form.

14. The method of making a foamed polyurethane which comprises reacting a polyurethane prepolymer, obtained by the reaction of one mole equivalent weight of a hydroxyl terminated polyol having a molecular weight of from 500 to 5000 and being selected from the group consisting of a polyalkylene ether glycol and a polyester, said polyester being the reaction product of a polycarboxylic acid and a polyhydric alcohol, with a substantial excess over a 1:1 mol equivalent weight ratio of an organic polyisocyanate having from 2 to 3 isocyanato groups with from about 1 to 3 parts by weight of water based on 100 parts by weight of said prepolymer in admixture with from about .05 to 5 percent by weight of a catalyst based on the weight of said prepolymer to produce a foamed polyurethane, said catalyst having the formula:

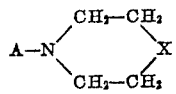

where A is selected from the group consisting of

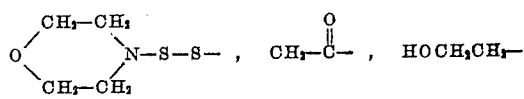

phenyl and R radicals where R is an acyclic aliphatic hydrocarbon radical of from 1 to 18 carbon atoms, and thereafter repeatedly wringing said foamed polyurethane at a temperature of from about 150 to 300° F. to break closed cells and remove free catalyst.

References Cited in the file of this patent
UNITED STATES PATENTS

| | | |
|---|---|---|
| 1,045,234 | Willis et al. | Nov. 26, 1912 |
| 2,779,689 | Reis | Jan. 29, 1957 |

OTHER REFERENCES

Remington et al.: "Urethane Resilient Foams Made From Polyesters," Du Pont Elastomers Div. Bul. HR–10, February 2, 1956, 14 pages; pages 4, 5 and 14 relied upon.

Winkler: "Rubber Age," volume 81, No. 5, August 1957, pages 799–803.

Heiss et al.: "Industrial and Engineering Chemistry," pages 1498–1503, volume 46, No. 7, July 1954.

UNITED STATES PATENT OFFICE
CERTIFICATE OF CORRECTION

Patent No. 2,993,869                         July 25, 1961

George T. Gmitter et al.

It is hereby certified that error appears in the above numbered patent requiring correction and that the said Letters Patent should read as corrected below.

Column 12, lines 12 to 15, the formula should appear as shown below instead of as in the patent:

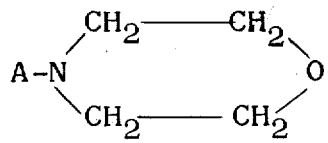

Signed and sealed this 2nd day of January 1962.

(SEAL)
Attest:

ERNEST W. SWIDER                         DAVID L. LADD
Attesting Officer                           Commissioner of Patents

USCOMM-DC